United States Patent
Ho et al.

(10) Patent No.: US 7,110,324 B2
(45) Date of Patent: Sep. 19, 2006

(54) UNIVERSAL REPLACEABLE BACK RADAR

(75) Inventors: Jenchun Ho, Kaohsiung Hsien (TW); Chris Lee, Kaohsiung Hsien (TW)

(73) Assignee: Whetron Electronics Co., Ltd., Kaohsiung Hsien (TW)

( * ) Notice: Subject to any disclaimer, the term of this patent is extended or adjusted under 35 U.S.C. 154(b) by 11 days.

(21) Appl. No.: 11/062,608

(22) Filed: Feb. 22, 2005

(65) Prior Publication Data

US 2006/0187756 A1    Aug. 24, 2006

(51) Int. Cl.
  *G01S 15/93*  (2006.01)
  *B60Q 1/48*  (2006.01)
  *G08G 1/14*  (2006.01)

(52) U.S. Cl. .................. 367/99; 367/909; 340/435; 340/904; 340/693.9

(58) Field of Classification Search ............. 367/99, 367/909; 340/435, 904, 932.2, 693.9
See application file for complete search history.

(56) References Cited

U.S. PATENT DOCUMENTS

| | | | |
|---|---|---|---|
| 4,803,670 A * | 2/1989 | Chen | 367/99 |
| 6,250,162 B1 * | 6/2001 | Amaike et al. | 73/642 |
| 6,279,210 B1 * | 8/2001 | Faass et al. | 24/457 |
| 6,496,138 B1 * | 12/2002 | Honma | 342/70 |
| 6,909,670 B1 * | 6/2005 | Li | 367/140 |
| 2005/0230581 A1 * | 10/2005 | Gau | 248/229.1 |
| 2005/0242933 A1 * | 11/2005 | Loh | 340/435 |
| 2006/0022844 A1 * | 2/2006 | Kawashima | 340/943 |

* cited by examiner

*Primary Examiner*—Ian J. Lobo
(74) *Attorney, Agent, or Firm*—Birch, Stewart, Kolasch & Birch, LLP

(57) ABSTRACT

The present invention discloses a universal replaceable back radar, wherein a head sleeve and a vehicle-reversing module thereof are separately designed and coated, an ultrasonic head is coupled to the connecting block of the vehicle-reversing module, an angle-adjust pad is also clamped to the connecting block of the vehicle-reversing module, and a big and a small hook platelets each with different heights are separately installed at both sides of one face of the angle-adjust pad and press against the internal face of a downward-tilt or an upward-tilt bumper. The universal replaceable back radar of the present invention can simplify the assemblage thereof and save the coating step thereof and its man-hour.

9 Claims, 6 Drawing Sheets

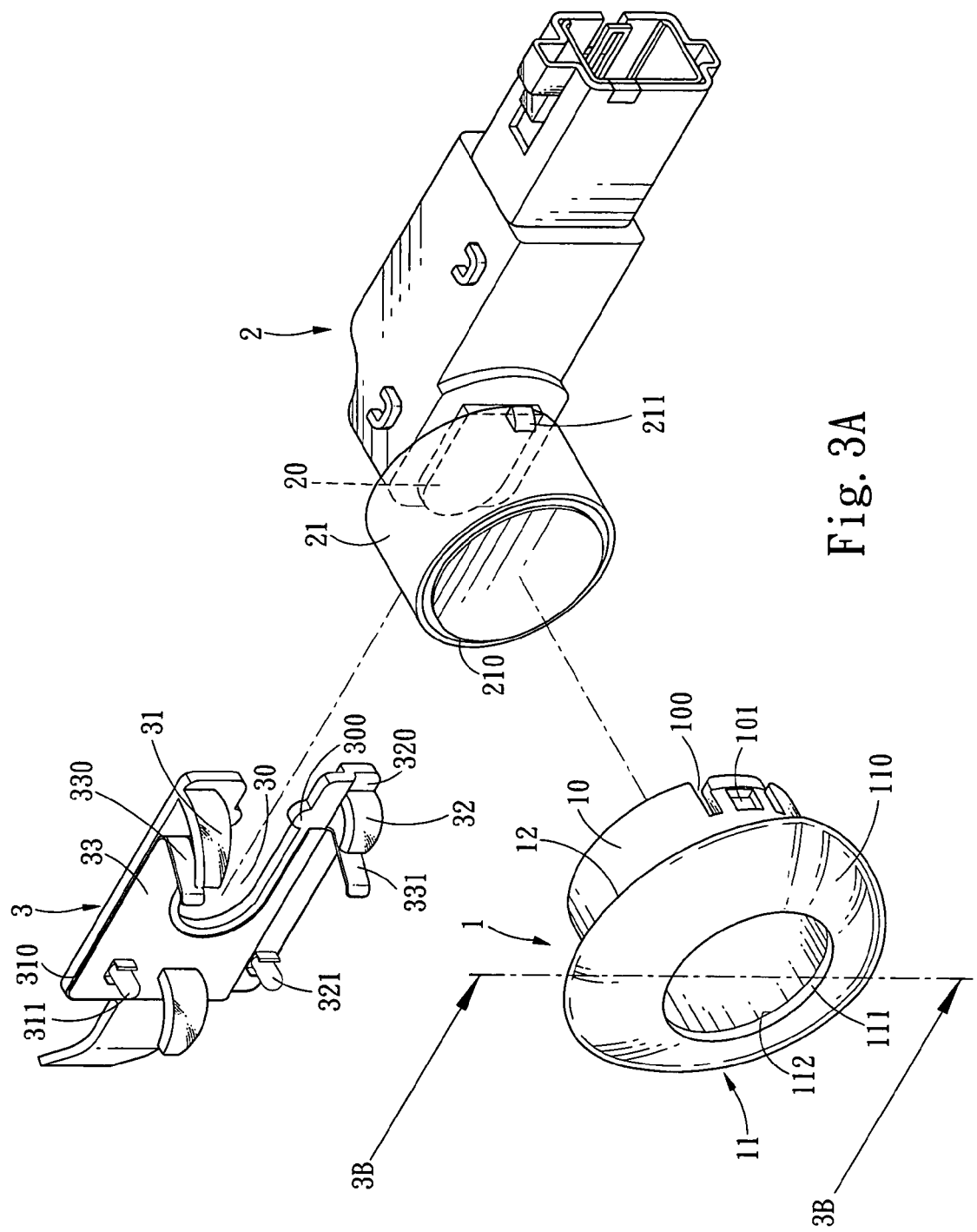

UNIVERSAL REPLACEABLE BACK RADAR

FIELD OF THE INVETNION

The present invention relates to a back radar, particularly to a universal replaceable back radar, wherein the head sleeve and the vehicle-reversing module are separately designed and coated.

BACKGROUND OF THE INVENTION

As the technology and science continuously progress and the standard of living continuously rises, the automobile has been the primary transportation equipment in daily living and brings great convenience to people, and almost every family has at least one automobile now. However, owing to fast-increasing quantity of the automobiles, the streets are crowded with the automobiles; thus, in addition to that driving the automobile always has a crisis of collision, street parking also challenges the driver's skill because of the obstacles around the parking place or other automobiles before or behind the parking bay. Furthermore, some driver, whose driving skill is not sophisticated enough, cannot accurately estimate the distance between the automobile and the obstacles around the parking bay by visual observation, so that a scratch or collision will occur often, which puts a great strain on the driver, and besides the damage of the driver's own automobile, the driver has to reimburse the damage to another's automobile if the collision incurs a damage to another's automobile.

Thus, there is a manufacturer developing a device of back radar, wherein an infrared detector, or another sensor, is installed on the rear bumper or another portion of the automobile and a receiver is installed inside the driving compartment. When reversing the automobile, the detector A installed in the rear of the automobile, as shown in FIG. 1 and FIG. 2, can measure the distance between the automobile and the obstacles behind the automobile. When the distance is equal to or short than the preset value, the receiver inside the driving compartment will display and alarm to remind the driver to keep on reversing or to drive forward. Such a device can help the driver of a big vehicle or the driver lacking sophisticated skill to some extent; however it has the following drawbacks:

Firstly, the inner face the cover flange B1 of the head sleeve B of the conventional detector A is vertical, and the head sleeve B can only apply to a planar bumper and cannot apply to an upward-tilt or downward-tilt bumper; thus, the conventional detector cannot be assembled to various automobiles, and its utilization is limited.

Secondly, in the conventional detector A, the head sleeve B and the ultrasonic head C1 of the vehicle-reversing module C are coated separately before the ultrasonic head C1 is assembled to the device body; however, the appearance of the top portion of the ultrasonic head C1 will be muddled because of the previous coating, and the detecting face's paint of the ultrasonic head C1 cannot be concealed when the ultrasonic head C1 is further assembled into the head sleeve B; thus, additional coating is needed, and additional man-hour is spent thereon.

Thirdly, the head sleeve B and the vehicle-reversing module C are coated separately before assemblage; however, the paint on the surface of the ultrasonic head C1 is apt to be scratched when the ultrasonic head C1 is assembled into the head sleeve B, which needs additional coating step and lowers the efficiency of assemblage; furthermore, the workshop cannot rapidly assemble the ultrasonic head with the device body and the head sleeve B via preparing multiple ultrasonic heads C1 to meet the demand of the consumer; thus, the assemblage thereof is slow and time-consuming.

SUMMARY OF THE INVENTION

The present invention is to overcome the aforementioned problems of the conventional technology and to provide a universal replaceable back radar, wherein the head sleeve and the vehicle-reversing module can be effectively separately coated, which can enable the back radar to be fast assembled to various kinds of automobiles.

The primary objective of the present invention is to provide a universal replaceable back radar, wherein the head sleeve and the vehicle-reversing module are separately designed, and wherein the cover flange of the head sleeve is a convex surface with a tilt rear face, which can be adapted to downward-tilt or upward-tilt bumper, so that the back radar of the present invention can have a universal application.

Another objective of the present invention is to provide a universal replaceable back radar, wherein the head sleeve of the back radar sleeves the ultrasonic head of the vehicle-reversing module, and wherein an angle-adjust pad clamps the head sleeve and the vehicle-reversing module, and wherein the ultrasonic heads can be coated with different colors, so that the back radar of the present invention can accomplish a simplified assemblage.

Yet another objective of the present invention is to provide a universal replaceable back radar, wherein the central hole of the cover flange of the head sleeve has a convex perimeter, which can engage with the ultrasonic head of the vehicle-reversing module and can conceal the scratched paint on the perimeter of the ultrasonic head, so that the back radar of the present invention can have a well appearance.

Still another objective of the present invention is to provide a universal replaceable back radar, wherein in addition to that the vehicle-reversing module and the head sleeve are separately coated and the head sleeve protects the ultrasonic head, the angle-adjust pad has a notch, into which the connecting block of the vehicle-reversing module is inserted, and wherein a big and a small hook platelets each with different heights are installed on one face of the angle-adjust pad and press against the internal face of the downward-tilt or upward-tilt rear bumper of an automobile.

BRIEF DESCRIPTION OF THE DRAWINGS

FIG. 3A is a perspective exploded view of the present invention.

DETAILED DESCRIPTION OF THE PREFERRED EMBODIMENTS

Figure 1:
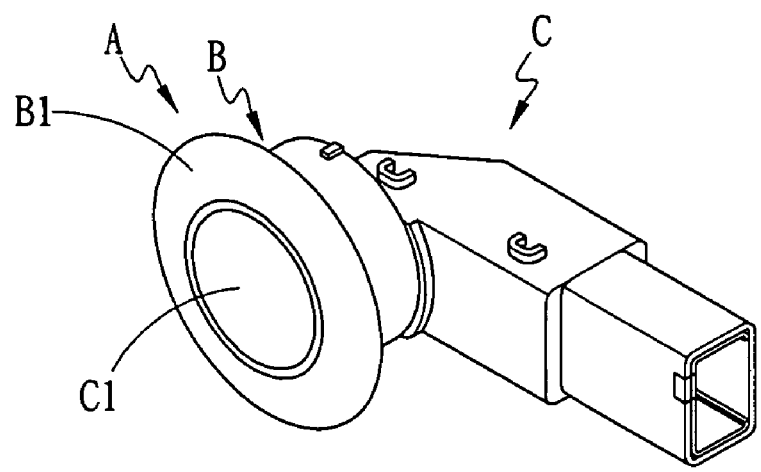
FIG. 1 is a perspective exploded view of a conventional back radar.
Figure 2:
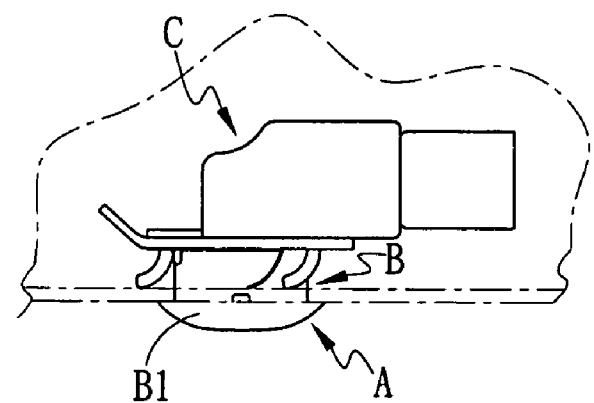
FIG. 2 is a schematic configuration diagram according to FIG. 1.
Figure 3B:
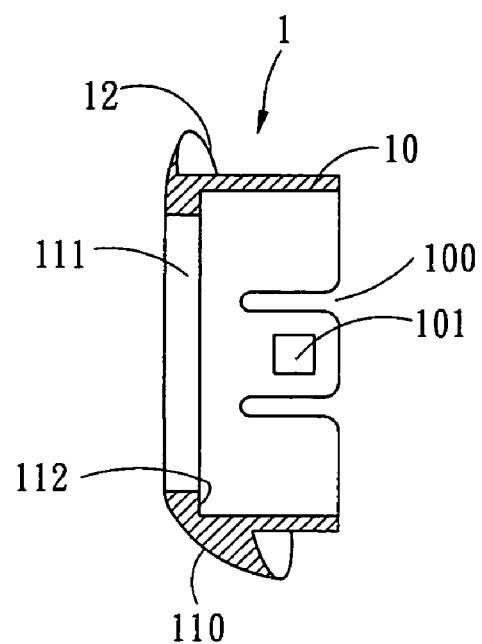
FIG. 3B is a sectional view along line 3B—3B in FIG. 3A.
Figure 4:
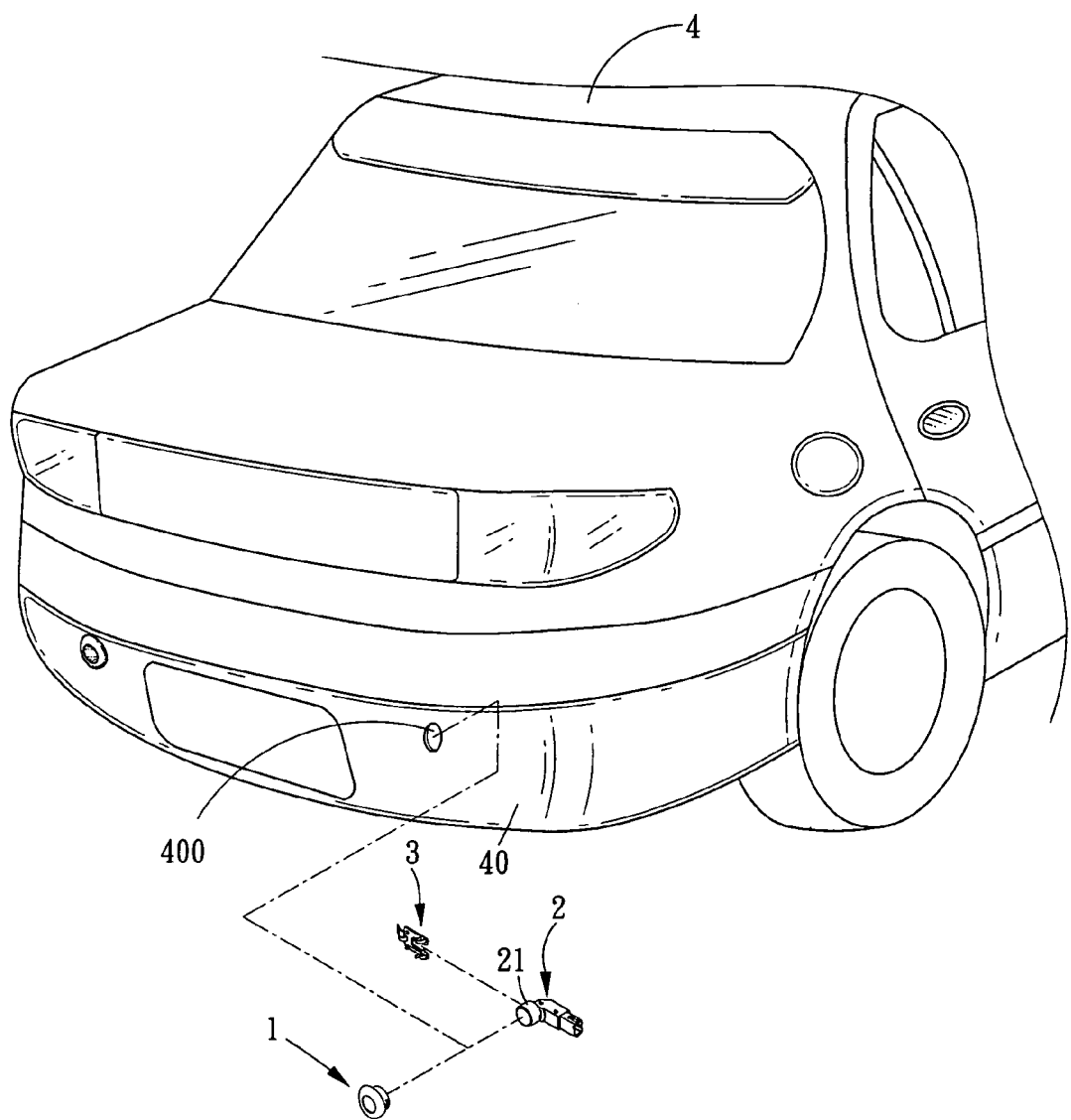
FIG. 4 is a perspective exploded view of the present invention assembled to a downward-tilt bumper.
Figure 8:
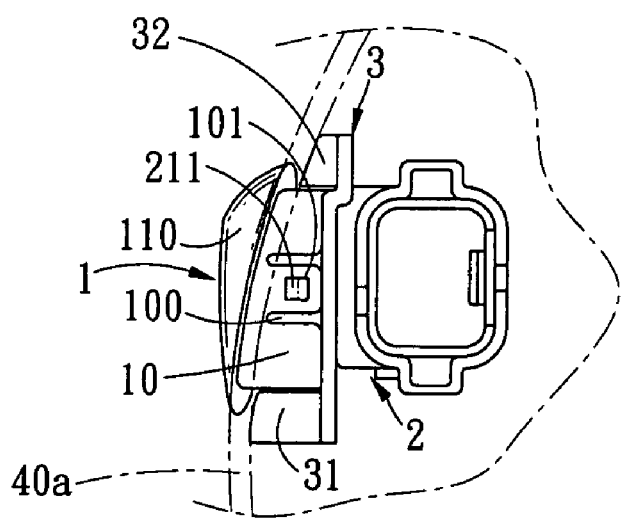
FIG. 8 is a side view of the present invention's configuration (assembled to an upward-tilt bumper).

Refer to FIG. 3A and FIG. 3B. The present invention's universal replaceable back radar comprises: a head sleeve 1; a vehicle-reversing module 2, which is fitted inside the encapsulating jacket 10 on one end of the head sleeve 1; an angle-adjust pad 3, which is clamped to the connecting block 20 of the vehicle-reversing module 2. An ultrasonic head 21 is fitted to the connecting blocking 2 of the vehicle-reversing module 2, and the paint on the surface of the ultrasonic head 21 will be protected from abrasion by the jacket of the sleeve head 1, and further, a hook platelet 31 and a hook platelet 32, which are of different heights and separately on either side of one face of the angle-adjust pad 3, will press against the internal face of a car 4's rear bumpers 40 or 40a, which tilts downward or upward (as shown in FIG. 4 and FIG. 8). Via the separate design and coating of the head sleeve 1 and the vehicle-reversing module 2, the assembling will be simplified, and the coating and its man-hour will also be saved.

The aforementioned head sleeve 1 has an encapsulating jacket 10 on one end thereof, and the central portion of the encapsulating jacket 10 has a round hole 100, which runs through to the central round hole 111 on the central portion of the cover flange 11 on the other end of the head sleeve 1; the encapsulating jacket 10 has a press-fit hole 101 on the periphery thereof; one face of the cover flange 11 is a convex surface 110, whose edge converges gradually from one side to the other side and the other face of the cover flange 11 is a tilt face 12; the diameter of the perimeter 112 of the central hole 111 of the cover flange 11 is the same as that of the round hole 100 of the encapsulating jacket 10.

The ultrasonic head 21 extends from the connecting block 20 of the vehicle-reversing module 2; a circular concavity 210 is formed around the perimeter of the top of the ultrasonic head 21. A press-fit protrusion 211, which corresponds to the press-fit hole 101 on the periphery of the encapsulating jacket 10, is installed on the periphery of the ultrasonic head 21. After the surface of the ultrasonic head 21 has been coated otherwise (with baked paint according to the color of the automobile), the ultrasonic head 21 will then be sleeved by the head sleeve 1 lest the baked paint on the surface of the ultrasonic head 21 be scratched. Thus, the appearance thereof can be maintained.

One side of the angle-adjust pad 3 has a notch 30, and two protrusions 300 are separately formed at two ends of two lateral side of the notch 30; a big hook platelet 31 is installed at the end of the face 310, and a small hook platelet 32 is installed at the end of a bent edge 320; a protuberance 311 and a protuberance 321 are separately installed near the edges of the face 310 and the bent edge 320 in order to snap-fit a reed 33; the reed 33 has the same shape as that of the angle-adjust pad 3 and has elastic hook platelets 330 and 331 installed on the ends corresponding to the big and small hook platelets 31 and 32.

Figure 5:
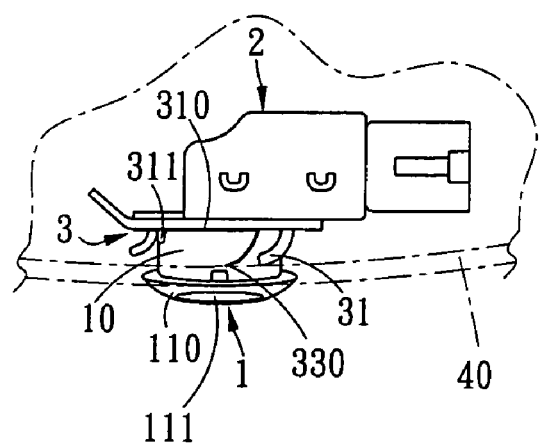
FIG. 5 is a top view of the present invention's configuration.

Before assemblage, the head sleeve 1 and the ultrasonic head 21 of the vehicle-reversing module 2 are separately coated (with baked paint of the color demanded by the consumer). Then, referring to FIG. 4 and FIG. 5, the ultrasonic head 21 of the vehicle-reversing module 2 is inserted through the round hole 400 or 400a drilled on the downward-tilt or upward-tilt rear bumper 40 or 40a of the car 4; then, the notch 30 of the angle-adjust pad 3 is click-fitted to the connecting block 20, which is in the rear of the ultrasonic head 21, and the protrusions 300, which are separately installed at two ends of two lateral side of the notch 30, can prevent the angle-adjust pad 3 from loosening or falling. The big and small hook platelets 31 and 32, and the elastic hook platelets 330 and 331 are to press against the internal face of the bumper 40 lest the vehicle-reversing module 2 swing. Through the central round hole 100, the encapsulating jacket 10 of the head sleeve 1 sleeves the ultrasonic head 21, and the press-fit protrusion 211 of the ultrasonic head 21 is press-fitted into the corresponding press-fit hole 101 on the periphery of the head sleeve 1.

Figure 6:
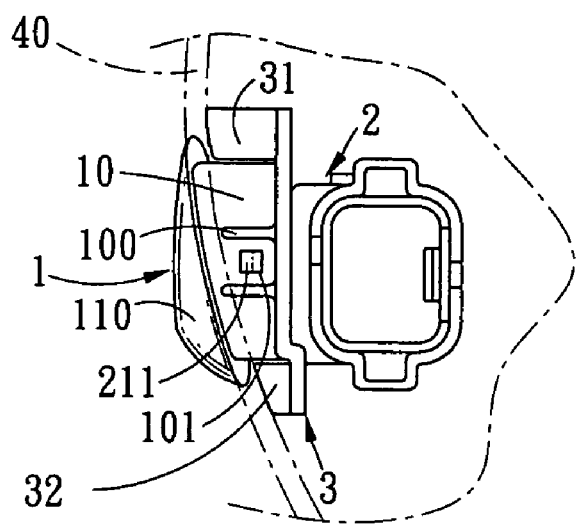
FIG. 6 is a side view of the present invention's configuration (assembled to a downward-tilt bumper).

In one embodiment of the present invention, the convex surface 110 of the head sleeve 1 is downward disposed according to the downward tilt of the rear bumper 40, and the tilt face 12 closely adheres to the surface of the bumper 40, as shown in FIG. 6. Thus, the vehicle-reversing module 2 is fixedly secured to the internal surface of the bumper 40 and maintained in the horizontal status and free from obliqueness.

Figure 7:
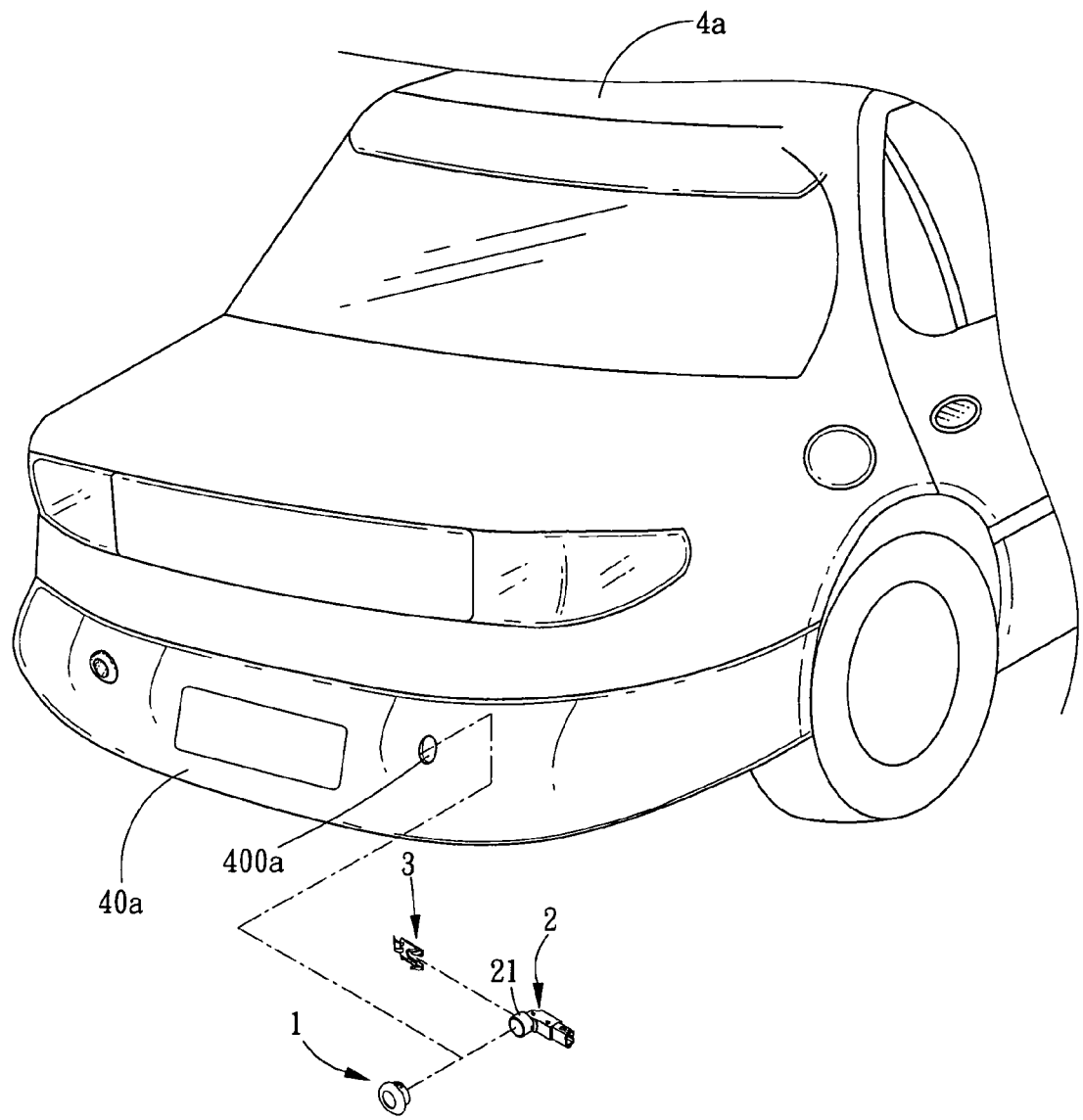
FIG. 7 is a perspective exploded view of the present invention assembled to an upward-tilt bumper.

Referring to FIG. 7, in another embodiment of the present invention, the ultrasonic head 21 of the vehicle-reversing module 2 is inserted through the round hole 400a drilled on the upward-tilt rear bumper 40a, and the angle-adjust pad 3 is clamped to the connecting block 20, and then the convex surface 110 of the head sleeve 1 is upward disposed, and the ultrasonic head 21 is sleeved by the head sleeve 1. Thereby, another assembling mode of the vehicle-reversing module 2 and head sleeve 1 is formed, as shown in FIG. 8.

What is claimed is:

1. A universal replaceable back radar, comprising:
    a head sleeve;
    a vehicle-reversing module, which is inserted inside an encapsulating jacket at one end of said head sleeve, wherein an ultrasonic head is installed at one end of a connecting block of said vehicle-reversing module; and
    an angle-adjust pad, which is clamped to said connecting block of said vehicle-reversing module, wherein a big and a small hook platelets each with different heights are separately installed at both sides of one face of said angle-adjust pad and press against the internal face of a downward-tilt or an upward-tilt bumper, and wherein via the separate design and coating of said head sleeve and said vehicle-reversing module, said ultrasonic head, which is coupled to one end of said vehicle-reversing module, is protected by said head sleeve lest the paint on the surface of said ultrasonic head be scratched.

2. The universal replaceable back radar according to claim 1, wherein said encapsulating jacket extending from one end of said head sleeve, and the central portion of said encapsulating jacket has a round hole, which runs through to a central hole on a cover flange on the other end of said head sleeve.

3. The universal replaceable back radar according to claim 2, wherein a press-fit hole is installed at a related position on the periphery of said encapsulating jacket.

4. The universal replaceable back radar according to claim 2, wherein one face of said cover flange is a convex surface, whose edge converges gradually from one side to the other side, and the other face of said cover flange is a tilt face.

5. The universal replaceable back radar according to claim 1, wherein said ultrasonic head extends from the exterior of said connecting block that is at one end of said vehicle-reversing module.

6. The universal replaceable back radar according to claim 5, wherein the top perimeter of said ultrasonic head has a circular concavity and the periphery of said ultrasonic head has a press-fit protrusion.

7. The universal replaceable back radar according to claim 1, wherein a notch is installed on one side of the exterior of said angle-adjust pad, and two corresponding protrusions are separately installed at the ends of two lateral sides of said notch, and a big hook platelet is installed at the end of one side of one face of said angle-adjust pad, and a small hook platelet is installed at the end of a bent edge on the other side.

8. The universal replaceable back radar according to claim 7, wherein corresponding protuberances are separately installed at one face and the top of said bent edge of said angle-adjust pad in order to snap-fit a reed.

9. The universal replaceable back radar according to claim 8, wherein elastic hook platelets are separately installed at the ends of two sides of said reed.

* * * * *